United States Patent [19]

Bäbler

[11] Patent Number: 5,074,918
[45] Date of Patent: Dec. 24, 1991

[54] PROCESS FOR CONDITIONING ORGANIC PIGMENTS

[75] Inventor: Fridolin Bäbler, Hoctessin, Del.

[73] Assignee: Ciba-Geigy Corporation, Ardsley, N.Y.

[21] Appl. No.: 548,032

[22] Filed: Jul. 5, 1990

[30] Foreign Application Priority Data

Jul. 13, 1989 [CH] Switzerland .................. 2631/89

[51] Int. Cl.$^5$ .............................................. C08K 13/08
[52] U.S. Cl. .................................... 106/493; 106/230; 106/231; 106/401; 106/404; 106/499; 106/502; 106/272
[58] Field of Search ............... 106/403, 404, 447, 493, 106/502, 311, 412, 230, 231, 476, 272

[56] References Cited

U.S. PATENT DOCUMENTS

| 2,772,982 | 12/1956 | Vesce | 106/502 |
|---|---|---|---|
| 3,389,105 | 3/1965 | Bolger | 106/404 |
| 3,767,444 | 10/1973 | Zeisberger | 106/502 |
| 3,773,535 | 11/1973 | Burgyan et al. | 106/502 |
| 3,951,849 | 4/1976 | Vickery et al. | 106/502 |
| 4,230,501 | 10/1980 | Howard et al. | 106/502 |
| 4,260,424 | 4/1981 | Mizoguchi et al. | 106/497 |
| 4,277,288 | 7/1981 | Lawrence et al. | 106/502 |
| 4,478,968 | 10/1984 | Jaffe | 524/88 |
| 4,756,759 | 7/1988 | Amon et al. | 106/501 |
| 4,783,540 | 11/1988 | Bäbler | 106/498 |
| 4,801,702 | 1/1989 | Bäbler | 540/144 |
| 4,946,509 | 8/1990 | Schwartz | 106/496 |

FOREIGN PATENT DOCUMENTS

| 0101666 | 2/1984 | European Pat. Off. | |
| 1042906 | 9/1966 | United Kingdom | 106/502 |

Primary Examiner—William R. Dixon, Jr.
Assistant Examiner—Scott L. Hertzog
Attorney, Agent, or Firm—Harry Falber

[57] ABSTRACT

A process for conditioning organic pigments by milling or kneading said pigments in the presence of 0.05 to 25% by weight, based on the pigment to be milled, of at least one micronized wax.

The process, in which the use of organic solvents may be dispensed with, yields in a single milling operation, pigments which are distinguished by excellent dispersibility and outstanding fastness properties.

9 Claims, No Drawings

PROCESS FOR CONDITIONING ORGANIC PIGMENTS

The present invention relates to a process for conditioning organic pigments using micronised waxes as grinding assistants.

Organic pigments which are obtained in their sythesis in coarse crystalline form normally have to be subjected to an aftertreatment or so-called conditioning. A host of conditioning methods are known in pigment technology. Usually they take the form of thermal aftertreatments with organic solvents or grinding procedures with suitable grinding assistants, in the presence or absence of organic solvents. For example, European patent application 0 101 666 and U.S. Pat. No. 4,801,702 disclose conditioning processes in which specific 1,2-dihydroxy compounds, viz. tricyclodecane or tricyclodecene alcohols, are used as grinding assistants. The pigments obtained by these conditioning processes, however, do not meet all of the requirements of current pigment technology. For example, they exhibit an undesirable fogging in specific applications.

A conditioning process which comprises subjecting a crude organic pigment, in the presence of a thermoplastic resin, to dry milling and subsequently to milling in water under alkaline conditions is disclosed in U.S. Pat. No. 4,478,968.

Surprisingly, it has now been found that, by using a minor amount (in comparison to the amount of pigment) of micronised wax, it is possible to prepare, in a single milling step, very finely particulate pigments of excellent dispersibility and having very good pigment properties.

Accordingly, the present invention relates to a process for conditioning organic pigments by milling or kneading said pigments in the presence of 0.05 to 25% by weight, based on the pigment to be milled, of at least one micronised wax.

Particularly suitable waxes are micronised polyamide, polypropylene and polyethylene/polytetrafluoroethylene waxes. It is preferred to use 2 to 12% by weight of the micronised wax, based on the pigment to be milled.

Preferred micronised waxes are:

micronised polyamide waxes having a maximum particle size of 15 μm and an average particle size of 1 to 5 μm, a density between 0.90 and 1.1 $g/cm^3$ at 25° C., and a melting point above 130° C.;

micronised polypropylene waxes and/or polypropylene copolymer waxes having a maximum particle size of 15 μm and an average particle size of 1.5 to 3.5 μm, a density between 0.90 and 1.10 $g/cm^3$ at 25° C. and a melting point above 130° C., and micronised polyethylene (high-density)/polytetrafluoroethylene waxes (combination polymers) having a maximum particle size of 15 μm and an average particle size of 1.5 bis 4.0 μm, a density between 0.95 and 1.15 $g/cm^3$ at 25° C. and a melting point above 100° C. Such micronised waxes are known and commercially available.

Wet milling and, in particular, dry salt milling by conventional methods are preferred. An organic solvent is preferably not added.

The assistants customarily used for milling, for example surfactants and/or organic solvents, may also be used in the process of this invention for obtaining very particular properties. Normally, however, their use can be dispensed with.

For dry salt milling it is preferred to use NaCl, $CaCl_2$, $Na_2SO_4$ or $Al_2(SO_4)_3$, with or without water of crystallisation. It is convenient to use 10–50 parts by weight of pigment to 1–150 parts by weight of salt. Working up is effected in a manner known per se by separating the pigment/salt mixture from the grinding media, then adding water and subsequently filtering the resultant pigment suspension. If desired, the pigment suspension is acidified or made alkaline before filtration and the pigment is stirred for 1 to 20 hours at 20° to 100° C. before isolation.

The micronised waxes intended for use in the process of this invention are also excellent milling assistants in the wet milling, in which the pigment suspension to be milled is normally kept neutral. However, it may in certain cases be expedient to adjust the pH of the pigment suspension to the acid or alkaline range.

Although the micronised waxes themselves act as texture improvers, it is entirely possible to use other texture improvers for further enhancement of the application properties of the milled pigments. These additional texture improvers may be added in an amount of 0.05–20% by weight, preferably 1–10% by weight, based on the pigment or mixture of pigments to be milled, before, during or after the milling operation.

Representative examples of suitable texture improvers are fatty acids of at least 12 carbon atoms such as stearic acid or behenic acid, the amides, salts or esters thereof, for example magnesium sterate, zinc sterate, aluminium stearate or magnesium behenate, and also quaternary ammonium compounds such as tris($C_1$–$C_4$-)alkylbenzylammonium salts, and plasticisers such as epoxidised soybean oil, waxes such as polyethylene wax, resin acids such as abietic acid, colophonium, hydrogenated or dimerised colophonium, $C_{12}$–$C_{18}$alkanedisulfonic acids, alkylphenols or alcohols such as stearyl alcohol, and also laurylamine or stearylamine as well as aliphatic 1,2-diols.

Preferred texture improvers are laurylamine or stearylamine, stearic acid, the amides, salts or esters thereof, epoxidised soybean oil, waxes, resin acids or aliphatic 1,2-diols.

The milling operation of this invention will normally be carried out in the absence of further organic solvents. Minor amounts may, however, be tolerated if they do not impair the process.

Milling or kneading is performed until the pigment is obtained in the desired transparent tinting strength. Depending on the milling or kneading apparatus employed, the batch, the speed of rotation, the pigment and the assistants, the time taken is from ¼ hour to 96 hours. The requisite milling time can be readily ascertained from case to case.

The grinding or kneading apparatus may be any suitable device which makes it possible for the pigment and an optional assistant or optional assistants, for example a carrier, to be subjected to strong mechanical forces in the dry state or in a liquid medium. Innumerable devices of this kind are known. They are based, for example, on the principle of a steep velocity gradient produced in liquid medium or of a sudden change in direction or, in particular, on an impact effect or mutual friction of grinding elements such as metal, glass or porcelain balls, plastic granules or sand grains, which are set in motion by rotation of the apparatus or, more effectively still, by vibrators or stirred devices such as glass bead mills.

The milling or kneading temperature is not crucial within technically reasonable limits. Milling or kneading is conveniently carried out in the temperature range from 5° to 90° C., preferably from 15° to 60° C.

Representative examples of organic pigments which can be conditioned by the process of this invention are pigments of the azo, diketopyrrolopyrrole, perylene, quinacridone, phthalocyanine, perinone, quinophthalone, isoindolinone, isoindoline, dioxazine, anthraquinone, thioindigo, methine or azomethine or metal complex series. Suitable pigments of the azomethine, methine and phthalocyanine series comprise the metal-free as well as the metal complexes.

Besides pure organic pigments, it is also possible to use pigment mixtures. In this case it is possible to prepare pigment alloys, for example those disclosed in European patent application 0 042 816 or, in suitable cases, pigment solutions.

Micronised polypropylene and polyamide waxes have such a pronounced action as grinding assistants that a change in the crystal modification of individual polymorphous pigments may occur during the milling operation.

The pigments obtained in this invention are suitable for pigmenting high molecular weight organic material, for example cellulose ethers and esters such as ethyl cellulose, acetyl cellulose, nitrocellulose, polyamides and polyurethanes or polyesters, natural resins or synthetic resins, especially urea/formaldehyde and melamine/formaldehyde resins, alkyd resins, phenolic plastics, polycarbonates, polyolefins such as polyethylene and polypropylene, and also polystyrene, polyvinyl chloride, polyacrylonitrile, polyacrylates, thermoplastic or curable acrylic resins, rubber, casein, silicone and silicone resins, singly or in mixtures. These high molecular weight compounds may be in the form of plastics, melts or spinning solutions, paints or printing inks. Depending on the envisaged end use, it is convenient to use the pigments as toners or in the form of preparations.

The high molecular weight organic material coloured with the pigments conditioned by the process of this invention is distinguished by very pure and level shades, good colour strength and high gloss, good fastness to light and weathering and good heat resistance. The process of this invention, in which only micronised polypropylene or polyamide waxes are used, yields pigments which are suitable preferably for pigmenting plastics materials such as PVC, polyolefins and engineering plastics. Pigments which are conditioned by the process of this invention using polyethelene/polytetrafluoroethylene are suitable for plastics materials and, in particular, for solvent-based and aqueous paints.

The pigments obtained by the process of this invention are often less dusty, have excellent dispersibility and are non-fogging. Thermoplastic polymers, in which the pigments conditioned by the process of this invention are incorporated, are positively influenced in respect of heat stability and deformation.

The invention is illustrated by the following Examples.

EXAMPLE 1

A 1 liter ball mill containing 1.5 kg of steel balls ($\phi$)=1.2 cm) and 150 g of nails (length 3 cm) as grinding media is charged with 5.1 g of the crude dioxazine pigment of formula

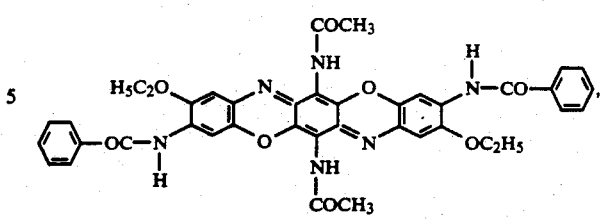

0.5 g of micronised polypropylene powder MICROPRO 400 ® (FLUORIDIENNE POLYMERES SA, B-1050, Brussels) and 20 g of aluminium sulfate [$Al_2(SO_4)_3$.15–18 $H_2O$]. The mill is firmly closed and rolled for 6 hours on a roller gear bed at room temperature. The milled stock is subsequently separated from the grinding media and stirred for 90 minutes at 70°–80° C. in a solution of 2.75 ml of concentrated sulfuric acid in 500 ml of water. The pigment is isolated by filtration and the filter cake is washed until neutral and free of salt with hot water and dried in a vacuum shelf drier at 80° C. The product so obtained is pulverised, affording 5.3 g of a violet pigment powder. Very strong violet colorations of excellent fastness to heat and light are obtained when this pigment is incorporated in plastics materials and paints.

EXAMPLE 2

The procedure of Example 1 is repeated, using in place of the dioxazine pigment the anthraquinoid pigment, Indanthrone Blue, of formula

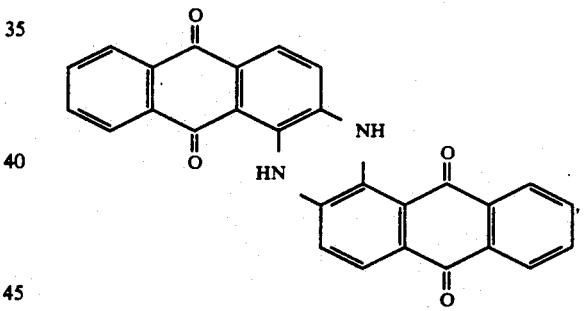

to give a blue pigment of excellent dispersibility which, compared with the crude starting form, produces substantially stronger colorations when incorporated in plastics materials and paints. The colorations are, in addition, fast to light, weathering, heat and migration and free from fogging.

EXAMPLE 3

The procedure of Example 1 is repeated, using in place of the dioxazine pigment the mixed synthesis diketopyrrolopyrrole pigment consisting of 99% of 1,4-diketo-3,6-diphenylpyrrolo[3,4-c]pyrrole and 1% of 1,4-diketo-3,6-bis(4-chlorophenyl)pyrrolo[3,4-c]pyrrole, to give a red pigment which has excellent dispersibility when incorporated in plastics materials and paints and gives substantially stronger yellowish-red colorations than the crude starting pigment.

EXAMPLE 4

In a 500 ml glass bead mill with a diameter of 8 cm, 9.0 g of the bisazo condensation pigment of formula

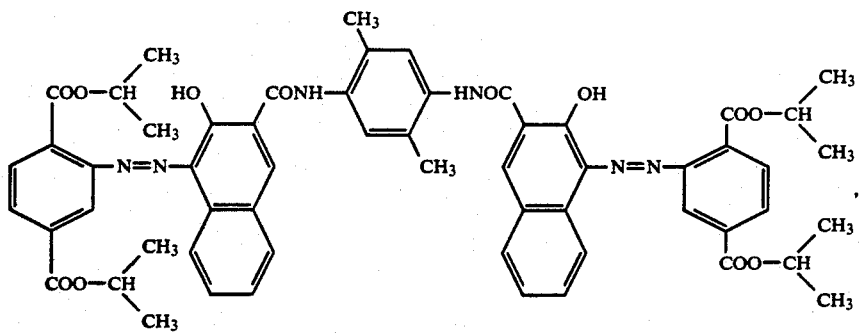

1.0 g of micronised polypropylene powder MICRO-PRO 400®, 125 g of water and 400 g of glass beads having a diameter of 3.5–4.0 mm are stirred for 6 hours at 320 rpm while cooling with water. The speed of the metal blade agitator with a diameter of 5.5 cm is 0.92 m/sec. The pigment suspension is separated from the glass beads, which are washed with water, and is then filtered. The filter cake is then dried at 70°–80° C. in a vacuum shelf drier, affording 9.3 g of a brown pigment which is pulverised. The pigment powder has excellent dispersibility in plastics materials and paints and gives much stronger colorations of excellent fastness properties than the crude starting pigment.

EXAMPLE 5

The procedure of Example 4 is repeated, using in place of the brown disazo condensation product the scarlet disazo condensation pigment of formula

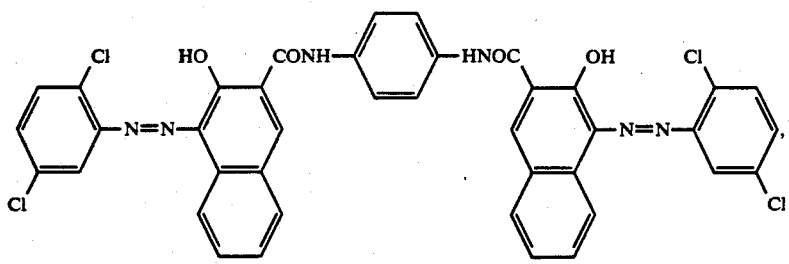

to give a pigment which has excellent dispersibility in plastics materials and paints and gives very strong yellowish-red colorations.

EXAMPLE 6

The procedure of Example 1 is repeated, using in place of the dioxazine pigment the crude form of the perylene pigment of formula

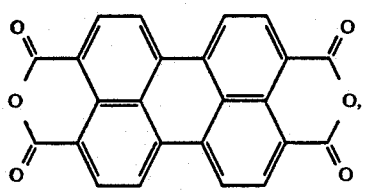

to give a red pigment which has excellent dispersibility in plastics materials and paints and gives much stronger, purer colorations of excellent fastness properties than the crude starting form.

EXAMPLE 7

The procedure of Example 3 is repeated, using in place of the mixed synthesis diketopyrrolopyrrole pigment 1,4-diketo-3,6-bis(4-chlorophenyl)pyrrolo[3,4-c]pyrrole to give a red pigment which has excellent dispersibility in plastics materials and paints and gives much stronger, purer colorations of excellent fastness properties than the crude starting form.

EXAMPLE 8

The procedure of Example 2 is repeated, using in place of 0.5 g of micronised polypropylene 1.0 g of the micronised polyethylene (high density)/polytetrafluoroethylene combination polymer AQUA POLYFLOW 411® (FLUORIDIENNE POLYMERES SA, B-1050 Brussels), to give a blue pigment having comparable properties.

EXAMPLE 9

The procedure of Example 1 is repeated, using in place of 0.5 g of micronised polypropylene 0.3 g of the micronised polyethylene (high density)/polytetrafluoroethylene combination polymer AQUA POLYFLOW 411 ® to give a violet pigment of comparable properties. It can be incorporated with particular advantage in aqueous automotive lacquers, but also in plastics materials and in printing inks, to give very strong colorations of excellent purity and of excellent fastness properties.

EXAMPLE 10

81 g of crude β-quinacridone pigment, 9 g of micronised polypropylene powder MICROPRO 400 ® and 700 ml of water are stirred in a glass beaker to a homogeneous suspension. The pigment suspension is milled intensively at 20°–25° C. for 80 minutes at a stirring speed of 3000 rpm and a pumping rate of 400 ml/min in a DYNO-Mill, type KDL® (supplied by Willy A. Bachofen, Basel), which is provided with a 600 ml steel container filled with 480-510 ml of glass beads having a diameter of ca. 1 mm. The pigment suspension is subsequently filtered, the filter cake is washed with water and dried in a vacuum shelf drier at 70°-80° C. The dried product is pulverised, affording a pigment which, when incorporated in plastics materials and paints, gives much stronger, purer violet colorations than the starting form. The pigment has excellent dispersibility and very good fastness to heat, light, weathering and migration.

EXAMPLE 11

27 g of crude indanthrone blue, 135 g of sodium chloride and 1.9 g of the micronised polyethylene (high density)/polytetrafluoroethylene combination polymer AQUA POLYFLOW 411 ® and 55 ml of diacetone alcohol are charged to a 500 ml laboratory kneader. Without external cooling, the mixture is kneaded for 7 hours. During kneading, the temperature of the mixture is 37° C. The kneading stock is then charged to 2 liters of water and stirred for 16 hours at room temperature. The pigment is isolated by filtration and the filter cake is washed with water until free of salt and solvent, and dried in a vacuum shelf drier at 70°-80° C. The product is pulverised to give a pigment which has excellent dispersibility when incorporated in plastics materials and paints, especially aqueous-based paints, and gives very strong pure colorations of very good fastness to light, weathering, heat and migration.

EXAMPLE 12

The procedure of Example 1 is repeated, using in place of the dioxazine pigment a pigment mixture consisting of 2.7 g of 2,9-dichloroquinacridone and 1.8 g of 1,4-diketo-3,6-bis(4-chlorophenyl)pyrrolo[3,4-c]pyrrole, to give the solid solution pigment described in U.S. patent specification No. 4,810,304 which has excellent dispersibility when incorporated in plastics materials and paints and gives strong bluish-red colorations of excellent fastness to heat, light and migration.

EXAMPLE 13

237 g of an aqueous filter cake (80 g dry weight) of the crude form of the isoindolinone pigment of formula

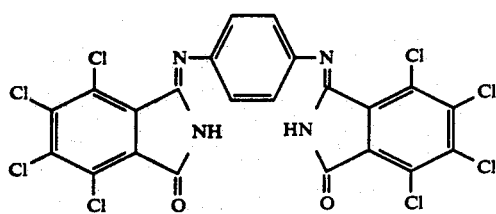

6.0 g of micronised polypropylene powder MICROPRO 400 ®, suspended in a mixture of 20 ml of water and 0.5 ml of diacetone alcohol, and 630 ml of water are stirred in a glass beaker to a homogeneous suspension. The pigment suspension is milled intensively at 20°-25° C. for 70 minutes at a stirring speed of 3000 rpm and a pumping rate of 400 ml/min in a DYNO-Mill, type KDL ® (supplied by Willy A. Bachofen, Basel), which is provided with a 600 ml steel container filled with 480-510 ml of glass beads having a diameter of ca. 1 mm. The pigment suspension is subsequently filtered and the filter cake is washed with water and dried in a vacuum shelf drier at 70°-80° C. The dried product is pulverised, affording a pigment which has excellent dispersibility when incorporated in plastics materials and paints and gives very strong transparent yellow colorations of excellent fastness to migration, heat, light and weathering.

EXAMPLE 14

In a 250 ml glass beaker having a diameter of 6 cm, 8.1 g of coarse crystalline copper phthalocyanine and 0.9 of micronised polypropylene powder MICROPRO 400 ® are milled for 3 hours in 40 g of water with 90 ml of sand (Ottawa sand having a diameter of 2-3 mm) using a nylon disc stirrer having a diameter of 4.5 cm at a stirring speed of 200 rpm, while cooling externally with water of ca. 8° C. The rotation speed of the nylon disc impeller is ca. 4.7 m/sec. The sand is separated from the milled pigment suspension and washed with water, and the suspension is then filtered. The filter cake is dried at 70°-80° C. in a vacuum shelf drier and the product is pulverised to give 8.3 g of a blue pigment which has excellent dispersibility when incorporated in plastics materials and paints and gives pure blue transparent colorations of excellent fastness properties.

EXAMPLE 15

The procedure of Example 13 is repeated, using only 68 g instead of 80 g of the yellow isoindolinone pigment, but together with 12 g of the orange isoindolinone pigment of formula

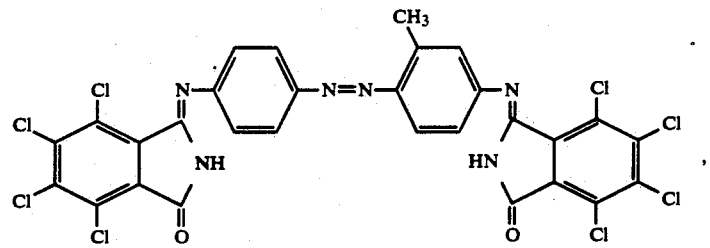

to give a solid solution pigment as described in European patent application 0 314 621 which has excellent dispersibility when incorporated in plastics materials and paints and gives strong reddish yellow colorations of excellent fastness properties.

EXAMPLE 16

The procedure of Example 1 is repeated, using in place of the dioxazine pigment the metal complex pigment of formula

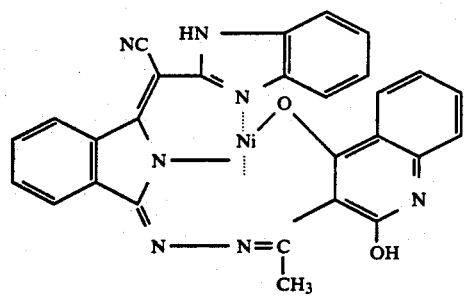

and in place of MICROPRO 400® the micronised polyamide wax LANCO-WAX A1601® (Langer & Co, D-2863 Ritterhude), to give a red pigment which has excellent dispersibility when incorporated in engineering plastics and produces much stronger red colorations of excellent fastness to light and heat than the red starting form.

EXAMPLE 17

A mixture of 130 g of steatite balls having a diameter of 8 mm, 47.5 g of an alkyd/melamine stoving lacquer consisting of 60 g of alkyd resin ®BECKOSOL 27-320 (Reichhold Chemie AG) 60% in xylene, 36 g of melamine resin ®SUPER-BECKAMIN 13-501 (Reichhold Chemie AG) 50% in a 2:1 mixture of xylene:butanol, 2 g of xylene and 2 g of ethylene glycol monomethyl ether, and 2.5 g of the pigment obtained in Example 11 are dispersed in a 200 ml glass flask with twist-off cap for 120 hours on a roller gear bed. After separating the glass balls, 2.4 g of the dispersed masstone mixture are mixed with 6 g of titanium dioxide ®KRONOS RN 59 (Kronos Titan GmbH) and a further 24.0 g of the alkyd/melamine stoving lacquer. The coloured lacquer solution is sprayed on to aluminium sheets and subsequently stoved for 30 minutes at 130° C. to give blue finishes of excellent fastness properties.

EXAMPLE 18

A mixture of
130 g of steatite balls (diameter=8 mm)
45.5 g of a thermosetting acrylic resin lacquer consisting of
  41.3 g of VIACRYL®VC 373 acrylic resin, 60% (VIANOVA Kunstharz AG),
  16.3 g of MAPRENAL®TTX melamine resin, 55%, (HOECHST AG),
  32.8 g of xylene,
  4.6 g of ethyl glycol acetate,
  2.0 g of butyl acetate, and
  1.0 g of silicone oil A®, 1% in xylene (BAYER AG), and
2.5 g of the dioxazine pigment obtained in Example 9 is dispersed in a 200 ml glass bottle with twist-off stopper for 72 hours on a roller gear bed. The steatite balls are removed and then 8.0 g of the dispersed masstone mixture, 0.6 g of ALCOA ® aluminium paste (60–65% aluminium content, ex Aluminium Corp. of America), 1.0 g of methyl ethyl ketone and 18.4 g of the above thermosetting acrylic lacquer are thoroughly mixed and the mixture is sprayed onto aluminium sheets and subsequently baked for 30 minutes at 130° C., to give very strong violet metal effect finishes of excellent fastness properties.

EXAMPLE 19

A mixture of 1.0 g of the pigment obtained in Example 7, 1.0 g of antioxidant (®IRGANOX 1010, Ciba-Geigy AG) and 1000 g of high density polyethylene granules (®VESTOLEN A 60-16, HULS) is stirred for 15 minutes in a glass flask on a roller gear table. The mixture is then extruded in two passes in a single screw extruder. The granulate so obtained is moulded to plates at 220° C. in an injection moulding machine (Allround Aarburg 200) and then post-formed for 5 minutes at 180° C. The mouldings are coloured in strong red shades of excellent fastness properties.

EXAMPLE 20

0.6 g of the solid solution pigment obtained in Example 12 are mixed with 67 g of polyvinyl chloride, 33 g of dioctyl phthalate, 2 g of dibutyltin laurate and 2 g of titanium dioxide and the mixture is processed to a thin sheet on a roll mill for 15 minutes at 160° C. The PVC sheet so obtained is coloured in a very strong bluish red shade which is fast to migration and light.

EXAMPLE 21

1000 g of polypropylene granules (®DAPLEN PT-55, ex Chemie Linz) and 20 g of a 50% pigment preparation consisting of 10 g of the pigment obtained in Example 13 and 10 g of magnesium behenate are thoroughly mixed in a mixing drum. The granules so obtained are melt spun at 260°–285° C. to yellow filaments of good light-fastness and textile fibre properties.

EXAMPLE 22

100 g of polycarbonate granules (MAKROLON 2800®, ex BAYER), and 0.2 g of the metal complex pigment obtained in Example 16 are premixed for 20 minutes in a 500 ml glass flask on a roller bed. The mixture is subsequently extruded to a ribbon in a single-screw extruder. The red plastic ribbon so obtained has excellent fastness to heat and light.

EXAMPLE 23

The procedure of Example 22 is repeated, using in place of polycarbonate the polymer mixture consisting of 50% of polycarbonate and 50% of polybutylene terephthalate XENOY 101 (General Electric Plastics BU, 4600 Bergen ob Zoon, Holland) to give a red plastic ribbon of comparably good properties.

EXAMPLE 24

A ca. 1 liter ball mill containing 1.5 kg of steel balls (φ)=1.2 cm) and 150 g of nails (length 3 cm) as grinding media is charged with 45 g of the crude γ-quinacridone of formula

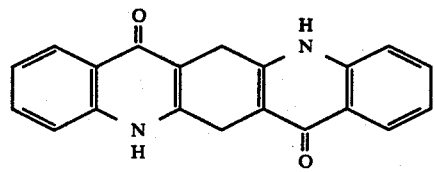

5 g of micronised polypropylene copolymer wax LANCO-WAX CP 1481 SF® (Langer & Co., D-2863 Ritterhude) and 5 g of anhydrous $Na_2SO_4$. The mill is firmly closed and rolled for 96 hours on a roller gear bed at room temperature. The milled stock is subsequently separated from the grinding media and stirred for 90 minutes at 70°–80° C. in a solution of 2.75 ml of concentrated sulfuric acid in 500 ml of water. The pigment is isolated by filtration and the filter cake is washed until neutral and free of salt with hot water and dried in a vacuum shelf drier at 80° C. The product so obtained is powdered, affording 43.5 g of a red pigment powder. Very strong red colorations of excellent fastness to heat, weathering and light are obtained when this pigment is incorporated in plastics and paints.

EXAMPLE 25

The procedure of Example 24 is repeated, using in place of γ-quinacridone crude 2,9-dichloroquinacridone of formula

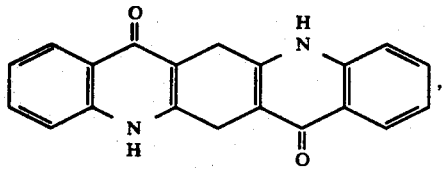

to give a bluish red pigment having comparably good properties.

What is claimed is:

1. A process for conditioning organic pigments by milling or kneading said pigments at a temperature between 5° and 90° C. in the presence of 2 to 12% by weight, based on the pigment to be milled, of a micronized wax selected from the group consisting of
   a polyamide wax having a maximum particle size of 15 μm and an average particle size of 1 to 5 μm, a density between 0.9 and 1.1 g/cm$^3$ at 25° C., and a melting point above 130° C.,
   a polypropylene wax and/or a polypropylene copolymer having a maximum particle size of 15 μm and an average particle size of 1.5 to 3.5 μm, a density between 0.9 and 1.1 g/cm$^3$ at 25° C., and a melting point above 130° C., and
   a polyethylene (high density)/polytetrafluoroethylene wax having a maximum particle size of 15 μm and an average particle size of 1.5 to 4.0 μm, a density between 0.9 and 1.15 g/cm$^3$ at 25° C., and a melting point above 100° C.

2. A process according to claim 1, wherein the milling is a dry salt milling.

3. A process according to claim 1, wherein the milling is an aqueous milling.

4. A process according to claim 1, wherein a texture improver is used in addition to the micronised wax.

5. A process according to claim 4, wherein the texture improver is selected from the group consisting of laurylamine or stearylamine, stearic acid, the amides, salts or esters thereof, epoxidised soybean oil, waxes, resin acids or an aliphatic 1,2-diol.

6. A process according to claim 1, wherein the pigments to be conditioned belong to the azo, diketopyrrolopyrrole, perylene, quinacridone, phthalocyanine, perinone, quinophthalone, isoindolinone, isoindoline, dioxazine, anthraquinone, thioindigo, methine, azomethine or metal complex series.

7. A process according to claim 6, wherein the pigments belong to the the azo, diketopyrrolopyrrole, perylene, phthalocyanine, perinone, isoindolinone, metal complex, quinacridone, anthraquinone, or dioxazine series.

8. A process according to claim 6, wherein the pigments belong to the quinacridone, anthraquinone, diketopyrrolopyrrole or dioxazine series.

9. A process for pigmenting high molecular weight organic material, which comprises the use of a pigment obtained according to claim 1.

* * * * *